United States Patent [19]

Hoche

[11] Patent Number: 5,340,602
[45] Date of Patent: Aug. 23, 1994

[54] PROCESS FOR THE PRODUCTION OF LOW CHOLESTEROL BUTTERFAT OR BUTTER

[76] Inventor: Hermann Hoche, 8567, Neunkirchen-Speikern, Fed. Rep. of Germany

[21] Appl. No.: 117,547

[22] Filed: Sep. 7, 1993

Related U.S. Application Data

[63] Continuation of Ser. No. 892,596, May 28, 1992, abandoned, which is a continuation of Ser. No. 634,164, Dec. 13, 1990, abandoned.

[30] Foreign Application Priority Data

Apr. 20, 1989 [EP] European Pat. Off. ........ 89107138.3

[51] Int. Cl.$^5$ .............................................. A23C 15/00
[52] U.S. Cl. .................... 426/664; 426/317; 426/511; 426/581; 203/95
[58] Field of Search ............. 426/317, 511, 581, 664; 203/95

[56] References Cited

U.S. PATENT DOCUMENTS 2,621,196 12/1952 Thurman .......................... 260/428
5,024,846 6/1991 McLachlan et al. ............... 426/425

OTHER PUBLICATIONS

Dudrow, Journal of the American Oil Chemists Society, vol. 60, No. 2, pp. 272-274, 1983.
Mounts, Journal of the American Oil Chemists Society, vol. 58, No. 1, pp. 51A-54A, 1981.
Arul, Journal of Dairy Research, vol. 55, No. 3, pp. 361-371, 1988.

Primary Examiner—Helen Pratt
Attorney, Agent, or Firm—Pravel, Hewitt, Kimball & Krieger

[57] ABSTRACT

A process for the production of low cholesterol butter fat or butter by steam treatment, wherein the fat is treated with steam in one or more horizontal or slightly inclined reaction pipes at a temperature of from 195° to 250° C. and at a pressure of from 0.5 to 5 mbar, the steam is injected from one or more steam pipes arranged parallel with each other which extend through the layer which conducts the liquid fat (oil) along the entire length of the reaction pipe and having boreholes in the pipe wall as outlet apertures for the steam, into the oil stream flowing in the reaction pipe axial direction, the vapors are separated and the fat is cooled, to which optionally fat recombination substances may be added.

14 Claims, 2 Drawing Sheets

PROCESS FOR THE PRODUCTION OF LOW CHOLESTEROL BUTTERFAT OR BUTTER

This is a continuation of application Ser. No. 07/892,596 filed on May 28, 1992 now abandoned, which is a continuation of application Ser. No. 07/634,164 filed on Dec. 13, 1990.

The invention concerns a process for the production of low cholesterol butter fat or butter as well as those products which are low in their content of cholesterol. The invention also concerns an installation for the reduction of the cholesterol content in fats and its application.

Butter fats and butter are valuable materials, without which the nutritional requirement is not conceivable. Butter is usually obtained as a plastic mixture from the milk, cream or the head of the milk, also when using water and table salt.

Various sorts of butter are known, for example sour cream butter, creamery butter or mildly soured butter, depending on the initial products and the processing conditions. Apart from this, butter does not constitute a clearly defined product as to its chemical composition, because the composition, consistency and color may fluctuate depending on the fodder and the conditions in which the cows are kept.

Butter fat is usually obtained from butter, from which water and milk components are removed. Thereby a longer storage life for the nutrient is achieved, which is therefore excellently suitable for industrial use in the production of foodstuffs, e.g. in the production of ice cream, biscuit products etc. However, butter fat can also be consumed directly as such.

The high nutritional/physiological value, as well as the popular flavor of butter and/or butter fat are beyond doubt. However, it is also known that the modern diet may lead in combination with the frequent vocational activities of the human being, which provide little movement, may lead to health problems. In this case attention is paid to the share of cholesterol in the nutrients.

Because of mistaken diet, but also because of certain enzyme defects, a pathologically increased cholesterol level may occur in the serum. This is considered to be partly responsible for the incidence of arteriosclerosis including the accompanying cardiac and circulation problems. Opinions concerning the interconnection between the consumption of food containing cholesterol and hypercholesteraemia, however, are divided. It is known that the cholesterol value is influenced by the consumption of foodstuffs, but also by psychic stress, the consumption of alcohol etc. In accordance with some individual works, oils having a high content of unsaturated fatty acids are capable of reducing the cholesterol content in the blood and in many cases they take effect against arteriosclerosis. However, it is a fact that these unsaturated fatty acids or nutritional products which contain them in a considerable proportion are not equivalent with respect to the share of valuable nutritional components to the natural product, butter and/or butter fat obtained from them.

WO-A-8802989 contains a process for the production of the cholesterol content in fats by treatment with steam. The precipitation film evaporation which is described there, however, has the disadvantages of a large consumption of vapor, a considerable loss of fat as well as a not yet optimal separation of the cholesterol.

The present invention is based on the object of producing natural butter and/or butter fat which constitutes a product which is low in undesirable accompanying substances and is unchanged in its natural composition of the fatty components, as well as to disclose processes and apparatus for this purpose which avoid the disadvantages described above of the prior art. In particular, this should be done without the use of chemical additives.

Undesirable accompanying substances in the butter and/or in the butter fat may be primarily cholesterol, but also rancid components and/or an increased proportion of free fatty acids as well as increased peroxide values. Furthermore, pesticides are undesirable, which may enter the butter and/or butter fat because of the nutrition of the animals producing the milk.

This object is achieved by the discovery of a process for the production of low cholesterol butter fat and/or butter by steam treatment, wherein the fat is treated in one or a plurality of horizontal or slightly inclined reaction tubes at a temperature of 195°–250° C. and at a pressure of from 0.5–5 mbar with steam, which is injected from one or a plurality of steam pipes, which are arranged parallel to each other and which extend over the entire length of the reaction pipe in the axial direction of the pipe through the layer which conducts the liquid fat (oil), and which are provided with boreholes in the pipe wall as outlets for the steam, into the oil stream flowing in the direction of the reaction pipe axis, the vapors are separated and the fat is cooled, to which optionally fat recombination substances are added.

The number and magnitude of the outlet apertures in the steam pipe walls, from which the water vapor is injected into the liquid fat, is guided by the pressure in the steam pipes, the level and temperature of the oil layer as well as the pressure in the reaction pipe.

The position of the boreholes in the steam pipes is selected in the process in accordance with the invention so that an optimal steam distribution and mixture are provided in the oil bed. For preference, the boreholes are arranged respectively in a steam pipe cross-sectional plane so that the connecting lines between the steam pipe center point and the outlet aperture form respectively an angle of 120° to each other and one of these connecting lines is perpendicular to the steam pipe axis in the direction of the reaction pipe base with the oil layer.

Using the injection method described above, it can be ensured that the emerging, finely distributed steam bubbles flow through the oil which is flowing in the direction of the reaction pipe axis in a vertical direction, whereby an ideal cross-current is formed. In a particularly advantageous embodiment of the process, the level of the layer of the axially flowing oil is adjusted in the reaction pipe so that it amounts to from 15 to 35% of the diameter of the reaction pipe.

Furthermore it is advantageous when using the process in accordance with the invention to insert the steam pipes in the oil layer so that the part of the oil layer which is above the pipes amounts to 85 to 70% of the height of the oil layer.

The process according to the invention is preferably carried out in the range from 200° to 245° C. and, with special preference at from 205° to 235° or 240° C. in a vacuum.

The butter fat can be brought directly to the reaction temperature, but it has been found advantageous for reasons of protective treatment of the fat to carry this out step-by-step. Preferably this can be done by heat exchangers.

The vacuum normally amounts to from 0.5 to 5 mbar and preferably 1 to 4 mbar, and pressures from 1 to 3 mbar have been found to be particularly favourable.

During the temperature treatment, entrainer or carrier material and/or vapor are used. Within the framework of the process according to the invention, water (steam) has been found to be particularly suitable, because it has been found to be relatively inactive in relation to the fat under the conditions of the reaction and naturally it can easily be condensed. It is especially surprising that, although the taste composition of the butter fat and/or of the butter obtainable therefrom is not altered, or is not substantially altered, by the heat treatment with the addition of water at the process temperatures, a very substantial separation of cholesterol is obtained. Evidently, under the operating conditions, the feared transesterification and therefore a change and the loss of the flavoring and aromatic components which round off the composition of the butter are avoided to a maximal extent.

The share of water which is added during the temperature treatment can be varied and amounts advantageously to from 0.5 to 2.5% by weight of water, based on the weight of the initial fat supplied. Particularly favourable values for the water supply are in the range from 0.8 to 2% by weight of water and/or 1 to 1.8% by weight of this entrainer agent.

Depending on the type of the process conditions selected, the reaction within the framework of the process according to the invention can require varying lengths of time. Treatment times of from 30 minutes to up to some hours have been found to be favourable, 1.5 to 3.5 hours being particularly expedient.

The vapor above the oil level can be quickly and evenly extracted in the process according to the invention, advantageously through a horizontal discharge pipe which extends over the length of the oil layer and is provided with apertures on its upper tangent, and which is arranged in the upper region of the reaction pipe above the oil layer. The discharge pipe can be shielded with a protective sheet, to ensure that the oil droplets which are carried along by the gas stream are retained, and they can then be conducted through a drain pipe into the fat supply.

In the process in accordance with the invention, the vapors are withdrawn continuously or in batches from the vapor chamber. They contain cholesterol, free fatty acids and, in certain circumstances, tocopherols. They can be reextraced from the vapor condensate. Here it is possible, after the separation has been performed, at least partially to recycle free fatty acids as well as optionally tocopherols to the end product of the process, if this is desirable.

The purified fat is preferably withdrawn at a temperature of from 40° to 45° C. from the reaction type, to prevent the formation of peroxide.

Due to the process according to the invention, it is surprisingly possible to reduce very substantially the cholesterol share of the butter products, usually butter fat, which is supplied. Normally a reduction of the cholesterol output value of at least 70% is achieved by the process according to the invention. By the use in the process of particularly favourable conditions within the framework of the inventive process, however, it is also possible partially to achieve still greater reductions of the cholesterol output value with a somewhat longer reaction time, for example advantageously to from 80 to 90% by weight or still less.

In this connection it is of interest that in the body of an adult, approximately 1 to 2 g cholesterol are synthesized each day with low fat diet from 0.04 to 0.1 g, with high fat diet up to 1.4 g of cholesterol can be daily ingested. According to Römpp "Chemielexikon", 8th edition, vol. 1, page 734, foodstuffs contain per 100 g: butter 244 mg, margarine 186 mg, beef 90 mg etc.

When using the process according to the invention, it is possible to reduce the cholesterol output values of butter (fat) in the range from 0.2 to 0.4 g/100 g to 0.01 to 0.1% by weight. Advantageously, it is however possible by using the process according to the invention to achieve cholesterol values in the range from 0.01 to 0.08, with special preference for up to 0.06% by weight. Furthermore, the content of free fatty acids can be adjusted to very low values or to almost zero. Finally it is also possible to reduce the content of pesticides, such as lindan, aldrin, thiodan, dieldrin, trichloroethane and DDT as well as metabolites to a value which is almost below the detectable limit.

Apart from a butter product, which has been reduced as regards its content of cholesterol and undesirable ancillary substances to an extent not yet known, the process according to the invention can also have the effect that the loss of the butter used in the course of the process and/or of the butter fat is very small (1.0 to 1.5% by weight) and that the necessary amount of vapor can be kept very low. Therefore the process also has surprising advantages in the economic respect.

Within the framework of the invention, a low cholesterol butter fat is also claimed, whose cholesterol content is below 0.1% by weight, advantageously in the range from 0.01 to 0.08 and particularly below the value of 0.06% by weight. The butter fat can have a content of free fatty acids in the range up to 0.1% by weight. A content of pesticides is frequently no longer detectable.

To the extent that this is desired within the framework of the invention, the low cholesterol fat, e.g. butter fat, can be recycled by the addition of butter recombination substances in butter, which in its natural fatty components and also in its taste can scarcely or not at all be differentiated from butter, but nevertheless it has a very substantially lower cholesterol content or is free of the latter. As such butter recombination substances, it is expedient to use those which are separated from butter during the production of butter fat. These substances are usually water and milk components, such as protein substances, lactose etc. In the production of butter in accordance with the invention, it is therefore expedient to add to the low cholesterol butter fat water, protein (components or substances) as well as optionally natural aromatic, flavoring or conservation components which are identical with the natural substances, such as are typical of butter. For this purpose it is advantageous to use tocopherols, carotinoids or salt. Optionally antioxidants which are admitted under the foodstuffs laws, such as citric acid, can be added. An addition of such components, and also of aromatic substances which are identical with the natural substances can also be expedient, because when carrying out the process in accordance with the invention for cholesterol reduction, a (partial) separation of slightly volatile aromatic or flavoring or conservation components, such as tocopherols, may take place.

Within the framework of the invention an installation for the reduction of the content of cholesterol in butter (fat) is also claimed wherein heat exchangers are used for heating the fat to reaction temperature, having at least one reaction pipe with lines for the injection of water vapor via steam pipes which extend in the reaction pipe parallel to the direction of the pipe axis, comprising outlet apertures for the steam in the pipe wall, discharge lines for vapors, a condensation apparatus for vapors, discharge lines for the purified fat, refrigerating apparatus for as well as storage containers for low cholesterol fat and/or admixtures, as well as optionally mixing tanks for cholesterol-free or low cholesterol fat and recombination substances.

This installation is particularly suitable for the reduction of the cholesterol content of butter fat or butter but also for the removal of undesirable accompanying substances, such as pesticides for example. These low cholesterol or cholesterol-free products are suitable for the production of foodstuffs and luxury foods in the manner known per se, but especially for diatetic products.

BRIEF DESCRIPTION OF THE DRAWINGS

The invention is further explained in FIGS. 1 and 2 and in the following example. FIG. 1 shows an installation according to the invention for the treatment of butter and/or butter fat, while FIG. 2 shows an embodiment of the reaction pipe contained in the installation.

Figure 1:
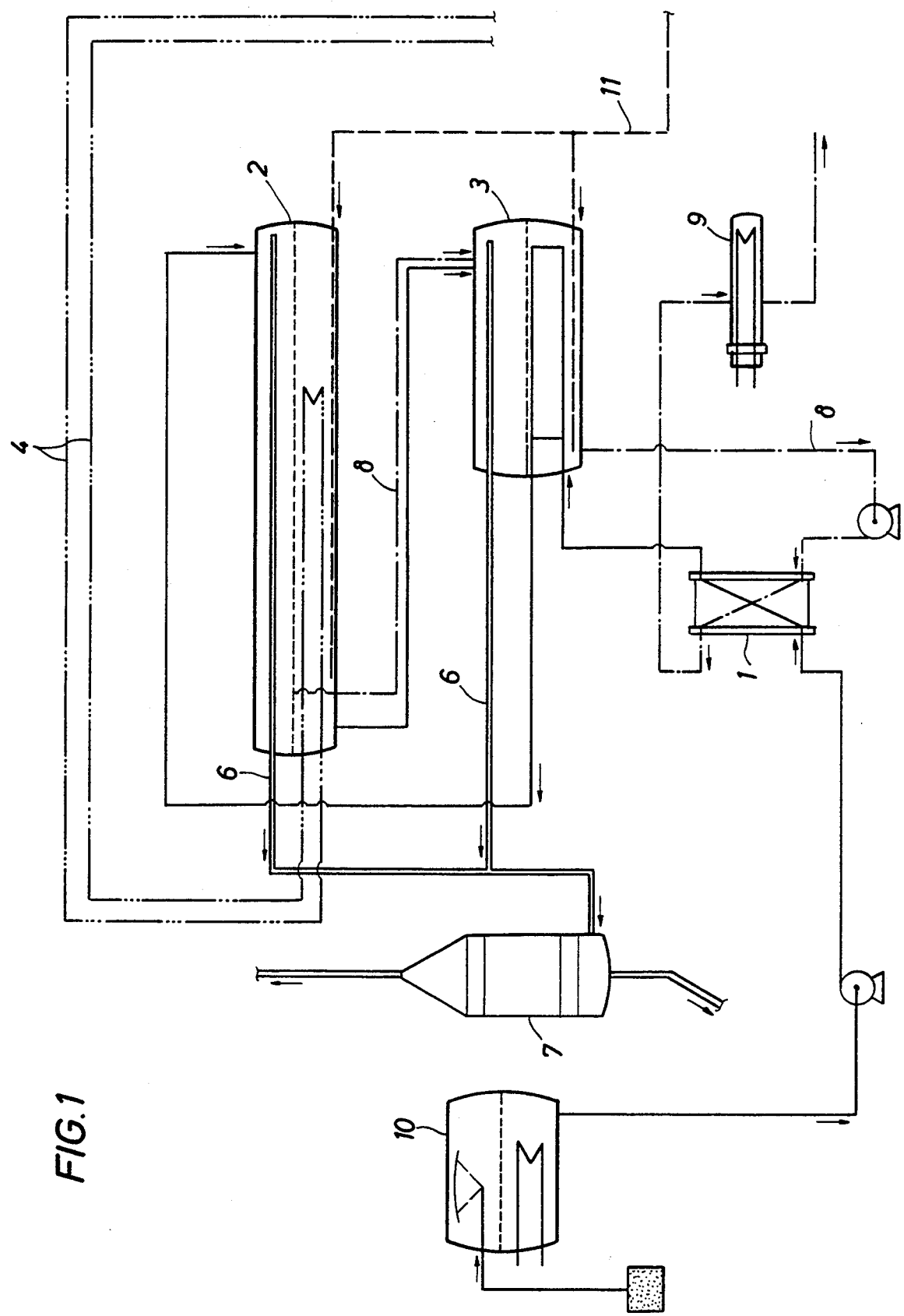
FIG. 1 shows an installation according to the invention for the treatment of butter and/or butter fat.

In accordance with FIG. 1, the starting product which is to be reduced in its content of cholesterol passes through a gas expeller 10 and enters into the heat exchanger 1 and then into a first reaction tube 3 with further heat exchange. It is conducted via pipelines into the downstream reaction pipe 2 and then further into reaction pipe 3, in which water vapor is constantly injected for heat treatment in vacuum. The necessary heat supply can be provided via the leads 4 by means of high pressure vapor, electrical power, heating oils etc. The water vapor is constantly injected in doses via the leads 11 into the reaction pipes 2, 3. The vapors are conducted via the discharge lines 6 into a condensation apparatus 7, from which the withdrawn fatty substances and/or water are deposited and/or separated in the head or in the sump. The low cholesterol fatty product which emerges from the reaction pipes 2, 3 passes via the discharge lines 8 through the heat exchanger 1 while being cooled, as well as through the refrigerator apparatus 9. The storage containers for low cholesterol fat or fat free of cholesterol and/or for recombination substances, as well as the mixing tanks in which the low cholesterol fat product can be reacted with recombination substances, are not shown in the installation.

Figure 2:
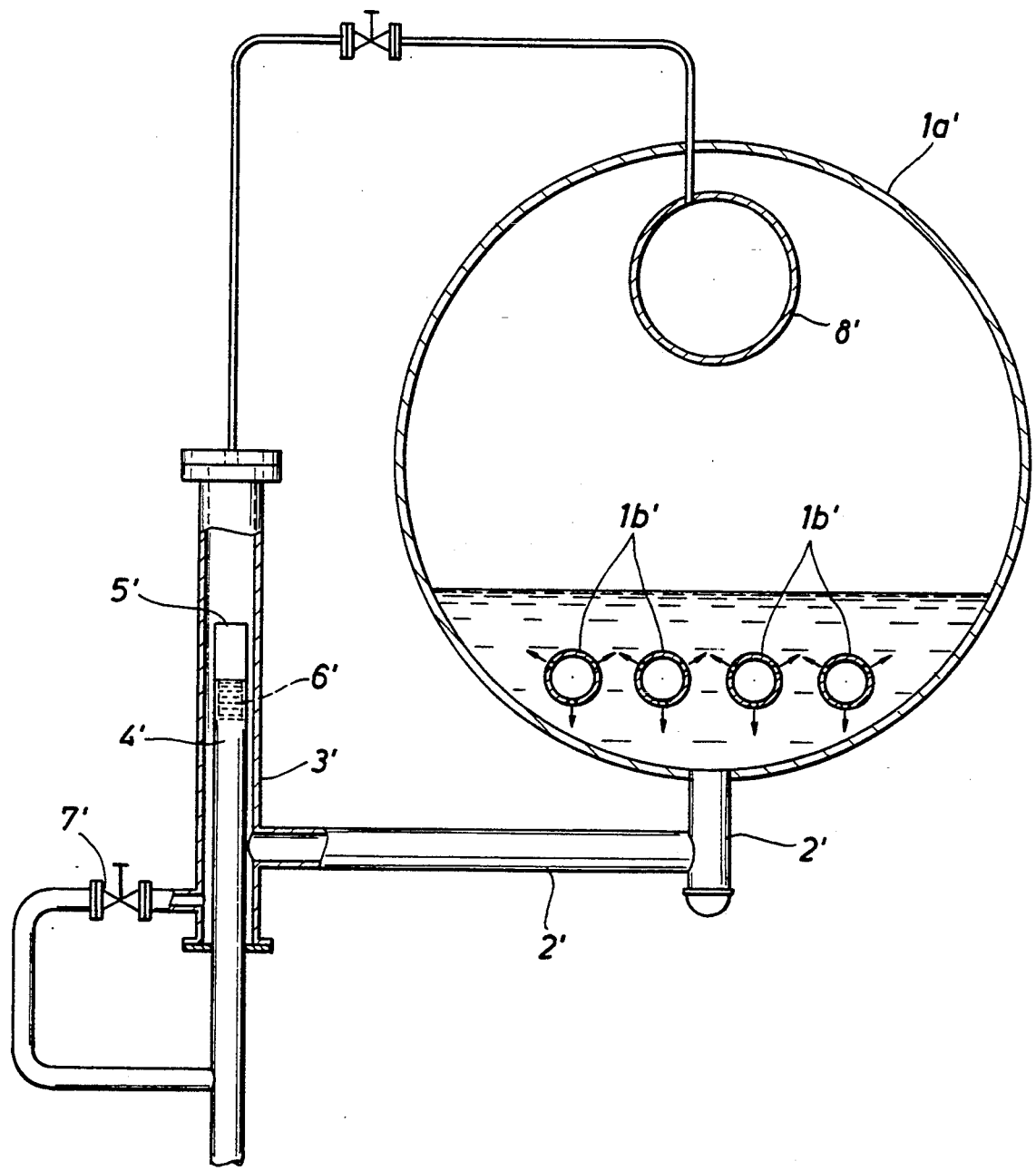
FIG. 2 shows an embodiment of the reaction pipe contained in the installation of FIG. 1.

FIG. 2 concerns a special variant of the reaction type which is used in the installation above. In the reaction type 1a' steam pipes 1b' extend parallel to the axial direction with outlet apertures in the pipe wall for the steam. An outlet 2' is connected with an apparatus arranged vertically as a double pipe and it opens into the outer tubular shell 3'. In the latter, the liquid rises to the overflow level of the inner outlet pipe 4', which simultaneously determines the level of the oil layer in the reaction pipe. This level can be regulated by exchangeable end pieces 5' on this pipe. This apparatus can also be operated by a threaded linkage 6' via a holder or an automatic device. The residual removal is carried out via a valve 7' which is connected with the casing. The reaction type is furthermore provided with a vapor offtake pipe 8'. Not shown in the drawing are guard sheets within the reaction pipe, which subdivide it and simultaneously are used for the accommodation and retention of heating and injection steam pipes and are mounted detachably against supports on the inner reaction pipe wall.

The invention will be further described below on the basis of a preferred embodiment which, however, should not be understood as a limitation.

EXAMPLE

In the installation which is shown in FIG. 1, butter fat is introduced in the reaction pipe according to FIG. 2 having the following characteristic data:

| content of free fatty acid: | 0.8% by weight |
|---|---|
| moisture | 0.1% by weight |
| cholesterol | 0.3% by weight |
| peroxide index | 0.5 |

The butter fat, after passing through the gas expeller is heated at a temperature in the range from 80° to 90° C. in a first heat exchange to 145° C. In the downstream reaction pipe, the temperature of the fat product is increased to 190° C. by heat exchangers, after which the product is introduced into the reaction pipe for heat treatment. There the product is treated at 230° or 190° C. and respectively at 1.5 mbar, wherein a total of 13 kg of steam/t fat product are supplied. The reaction time amounts to approximately 2 hours. The vapor product which is drawn off during the heat treatment in the reaction pipes at temperatures of 230° and 190° C. is constantly removed and separated via the condensation vessel. The heat treated product is cooled via the heat exchanger as well as the subsequent refrigerator apparatus and is transferred to a storage tank.

The butter fat treated in this manner has the following characteristic values:

| content of free fatty acid | max. 0.05% by weight |
|---|---|
| moisture | 0 |
| cholesterol | less than 0.08% by weight |
| peroxide index | 0 |

I claim:
1. A process for the production of low cholesterol butter fat and/or low cholesterol butter by steam treatment, comprising the steps of:
 treating butter or butter fat in one or a plurality of horizontal or slightly inclined reaction pipes at a temperature of 195°–250° C. and at a pressure from 0.5–5 mbar with steam such that the butter or butter fat becomes liquified, wherein the temperature during the steam treatment does not exceed 250° C., and wherein the steam is injected from one or a plurality of parallel steam pipes which extend over the entire length of the reaction pipe in the axial direction thereof and which extend through a layer of liquid butter or butter fat therein and which steam pipes are provided with boreholes in the pipe wall as outlet apertures for the steam such that the steam emerges from the boreholes into a liquid butter or butter fat stream flowing in the direction of the axis of the reaction pipe;
 separating vapors produced by the steam treatment from the butter or butter fat;

cooling the butter or butter fat ; and recovering butter or butter fat which is substantially unaltered in taste.

2. A process as set forth in claim 1, wherein the level of the layer of liquid butter or butter fat flowing in the direction of the axis of the reaction pipe is adjusted in the reaction pipe so that it amounts to from 15 to 35% of the diameter of the reaction pipe.

3. A process as set forth in claim 1, wherein the steam pipe is inserted in the liquid butter or butter fat layer so that the part of the liquid butter or butter fat layer which is above the pipes amounts to from 85 to 70% of the height of the layer.

4. A process as set forth in claim 1, wherein from 0.5 to 2.5% by weight of water based on the weight of the butter or butter fat which is supplied is dosed in during the temperature treatment.

5. A process as in claim 1, wherein the process is carried out in the range from 200° to 245° C., at a pressure of from 1 to 3 mbar, with the constant addition of from 1 to 2% by weight of water.

6. A process as set forth in claim 1, wherein the fat is brought step-by-step to the reaction temperature by means of heat exchangers.

7. A process as in claim 1, wherein the period in which the fat is in the reaction pipe amounts to from 1.5 to 3.5 hours.

8. A process as set forth in claim 1, wherein the vapors are condensed and free fatty acids and cholesterol are obtained from the condensate.

9. A process as in claim 1, wherein as the butter recombination substances, water, milk components as well as optionally tocopherol, carotinoids or salt are added.

10. A process as set forth in claim 1, wherein the butter fat supplied for temperature treatment has a content of free fatty acid of from 0.2 to 1% by weight and a cholesterol content of from 0.2 to 0.4% by weight.

11. A method for producing a low cholesterol foodstuff comprising replacing a high cholesterol fast ingredient selected from the group consisting of butter, butter fat, or other fat, with the low cholesterol butter or butter fast produced by the process of claim 1.

12. The process of claim 1, further comprising the step of:

adding to the cooling butter or butter fat recombination substances selected from the group consisting of water, milk, sugar, protein, aroma enhancers, flavor enhancers, and preservatives.

13. The process of claim 12, wherein the recombination substances include tocopherols, carotinoids, or salt.

14. The process of claim 12, wherein the recombination substances include antioxidants.

* * * * *